(12) United States Patent
Morimura

(10) Patent No.: US 6,750,647 B2
(45) Date of Patent: Jun. 15, 2004

(54) MAGNETIZING APPARATUS AND MAGNETIZING METHOD FOR MAGNETIZED PULSER RING, AND MAGNETIZED PULSER RING

(75) Inventor: Naoki Morimura, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 22 days.

(21) Appl. No.: 10/159,290

(22) Filed: Jun. 3, 2002

(65) Prior Publication Data

US 2002/0180425 A1 Dec. 5, 2002

(30) Foreign Application Priority Data

Jun. 1, 2001 (JP) .......................... 2001-166804

(51) Int. Cl.[7] .............. G01P 3/48; G01B 7/30
(52) U.S. Cl. ............ 324/174; 324/207.22; 324/207.25; 361/143
(58) Field of Search ................. 324/166, 173, 324/174, 207.22; 361/143, 146; 335/284; 384/448; 341/15

(56) References Cited

U.S. PATENT DOCUMENTS 5,742,160 A * 4/1998 Bergstedt et al. ...... 324/207.25
5,777,466 A * 7/1998 Sahashi .................. 324/174
5,899,573 A * 5/1999 Morita et al. ........... 384/448
5,967,669 A * 10/1999 Ouchi .................... 384/448
6,157,187 A * 12/2000 Piesch .................... 324/174
6,329,814 B1   12/2001 Ichiman et al. ........ 324/207.22
6,570,751 B2 * 5/2003 Iwamoto et al. ........ 361/143

FOREIGN PATENT DOCUMENTS

| JP | 10-115628 A | 5/1998 |
| JP | 11-242042 A | 9/1999 |

* cited by examiner

Primary Examiner—N. Le
Assistant Examiner—Darrell Kinder
(74) Attorney, Agent, or Firm—Nixon & Vanderhye P.C.

(57) ABSTRACT

There is provided magnetizing apparatus and magnetizing method for a magnetized pulser ring, by which magnetic force to which a cylindrical elastic magnetic member is magnetized can be enhanced, and yet in which centering of a magnetizing yoke is easy to achieve. A magnetizing portion of the magnetizing yoke is a conical surface slightly tilted with respect to an axis thereof. The magnetizing yoke is inserted into a cylindrical steel plate of the magnetized pulser ring so that the magnetizing portion of the magnetizing yoke is brought into close contact with one axial end portion of the cylindrical elastic magnetic member.

6 Claims, 1 Drawing Sheet

MAGNETIZING APPARATUS AND MAGNETIZING METHOD FOR MAGNETIZED PULSER RING, AND MAGNETIZED PULSER RING

BACKGROUND OF THE INVENTION

The present invention relates to magnetizing apparatus and magnetizing method for a magnetized pulser ring, as well as to a magnetized pulser ring.

Conventionally, rolling bearing units for rotatably supporting automobile wheels to a suspension system have been known in various structures. Among those rolling bearing units, there is one equipped with a rotational speed detecting device for detecting the rotational speed of wheels in order to control an antilock brake system (hereinafter, referred to as ABS) or traction control system (hereinafter, referred to as TCS).

Like this, the rotational speed detecting device to be incorporated in a rolling bearing unit includes a magnetized pulser ring which rotates along with the wheels, and a rotational speed sensor which outputs an output signal that varies at a frequency proportional to the rotational speed of the magnetized pulser ring (see Japanese Patent Laid-Open Publication HEI 10-115628).

The magnetized pulser rings are grouped in axial magnetization type and radial magnetization type. This radial-magnetization type magnetized pulser ring includes, as shown in FIG. 2, a cylindrical steel plate 21, and a cylindrical elastic magnetic member 22 provided over the entire periphery of the inner peripheral surface of the cylindrical steel plate 21.

Conventionally, there have been provided magnetizing apparatuses for radial-magnetization type magnetized pulser rings, which have a magnetizing yoke 23 having a cylindrical surface whose outer diameter is smaller than the inner diameter of the cylindrical elastic magnetic member 22, so that the magnetizing yoke 23 is made easier to insert into the cylindrical steel plate 21. Although not shown, N-pole areas and S-pole areas are alternately provided over the entire circumference on the outer periphery of the magnetizing yoke 23.

With the magnetizing apparatus of this construction, the magnetizing yoke 23 having a cylindrical surface is inserted into the cylindrical steel plate 21 so that the magnetizing yoke 23 is radially opposed to the cylindrical elastic magnetic member 22, thus achieving the magnetization of the cylindrical elastic magnetic member 22. As a result of this, N-pole areas and S-pole areas are alternately formed over the entire circumferential periphery of the cylindrical elastic magnetic member 22.

However, according to this conventional magnetizing apparatus for a magnetized pulser ring, because the outer circumferential surface of the magnetizing yoke 23 is a circumferential surface having a diameter smaller than the inner diameter of the cylindrical elastic magnetic member 22, there would occur a gap D between the magnetizing yoke 23 and the cylindrical elastic magnetic member 22 in performing the magnetization of the cylindrical elastic magnetic member 22. This would cause defect that the cylindrical elastic magnetic member 22 can be magnetized only to about 80% of a target magnetic force. For example, using the cylindrical elastic magnetic member 22 of such a weak magnetic force in an ABS-use rotational speed detecting device would cause the output signal of the rotational speed detecting device to become unstable.

Also, since the outer diameter of the cylindrical surface of the magnetizing yoke 23 is smaller than the inner diameter of the cylindrical elastic magnetic member 22, the magnetizing yoke 23 is more likely to be decentered with respect to the cylindrical elastic magnetic member 22. This causes a defect that the centering of the magnetizing yoke 23 with respect to the cylindrical elastic magnetic member 22 is difficult to achieve.

SUMMARY OF THE INVENTION

Accordingly, an object of the present invention is to provide magnetizing apparatus and magnetizing method for a magnetized pulser ring, as well as to a magnetized pulser ring, by which the magnetic force to which the cylindrical elastic magnetic member is magnetized can be enhanced, and yet in which the centering of the magnetizing yoke is easy to achieve.

In order to achieve the above object, there is provided a magnetizing apparatus for a magnetized pulser ring, in which a magnetizing portion of a magnetizing yoke is radially opposed to a cylindrical elastic magnetic member provided on a circumferential surface of a cylindrical steel plate so that magnetic-pole areas of opposite polarities are alternately formed circumferentially on the cylindrical elastic magnetic member, wherein:

the magnetizing portion is a conical surface slightly tilted with respect to an axis of the magnetizing yoke.

With this magnetizing apparatus for a magnetized pulser ring, for magnetization of the cylindrical elastic magnetic member, the magnetizing yoke is inserted into the cylindrical steel plate so that the magnetizing portion of the magnetizing yoke is radially opposed to the cylindrical elastic magnetic member. In this operation, when the magnetizing portion of the magnetizing yoke is brought into close contact with at least an axial end portion of the cylindrical elastic magnetic member, the magnetizing yoke becomes in its entire circumference close to or in contact with the cylindrical elastic magnetic member, because the magnetizing portion is a conical surface slightly tilted with respect to the axis. Accordingly, the magnetic force to which the cylindrical elastic magnetic member is magnetized can be enhanced. That is, the cylindrical elastic magnetic member can be magnetized sufficiently and reliably.

Also, because the magnetizing portion of the magnetizing yoke is a conical surface slightly tilted with respect to the axis, bringing the magnetizing portion of the magnetizing yoke into close contact with at least an axial end portion of the cylindrical elastic magnetic member makes the cylindrical elastic magnetic member and the magnetizing yoke concentric with each other. Accordingly, the magnetizing yoke can be centered with respect to the cylindrical elastic magnetic member easily and reliably.

Also, because the magnetizing portion of the magnetizing yoke is a conical surface tilted with respect to the axis, the insertion of the magnetizing yoke into the cylindrical steel plate can also be achieved easily.

In an embodiment, the conical surface which is the magnetizing portion is a convex surface, whereby the cylindrical elastic magnetic member is magnetized from an inner circumferential surface side of the cylindrical elastic magnetic member provided on an inner circumferential surface of the cylindrical steel plate.

With the magnetizing apparatus for a magnetized pulser ring in this embodiment, because the conical surface, i.e., the magnetizing portion of the magnetizing yoke is a convex surface, the cylindrical elastic magnetic member provided on the inner circumferential surface of the cylindrical steel plate can easily be magnetized from its inner circumferential surface side.

In an embodiment, the conical surface which is the magnetizing portion is a concave surface, whereby the cylindrical elastic magnetic member is magnetized from an outer circumferential surface side of the cylindrical elastic magnetic member provided on an outer circumferential surface of the cylindrical steel plate.

With the magnetizing apparatus for a magnetized pulser ring in this embodiment, because the conical surface of the magnetizing portion of the magnetizing yoke is a concave surface, the cylindrical elastic magnetic member provided on the outer circumferential surface of the cylindrical steel plate can be magnetized easily from its outer circumferential surface side.

A magnetizing method for a magnetized pulser ring of the present invention comprises the step of bringing the conical surface which is the magnetizing portion of the magnetizing apparatus for a magnetized pulser ring into close contact with at least an axial end portion of the cylindrical elastic magnetic member, thereby allowing the cylindrical elastic magnetic member to be magnetized.

According to the magnetizing method for a magnetized pulser ring, the magnetizing yoke is inserted into the cylindrical steel plate so that the conical surface, i.e., the magnetizing portion is brought into close contact with at least an axial end portion of the cylindrical elastic magnetic member. Then, the magnetizing yoke becomes in its entire circumference close to or in contact with the cylindrical elastic magnetic member, because the magnetizing portion of the magnetizing yoke is a conical surface slightly tilted with respect to the axis. Accordingly, the magnetic force to which the cylindrical elastic magnetic member is magnetized can be enhanced. That is, the cylindrical elastic magnetic member can be magnetized sufficiently and reliably.

Also, when the magnetizing portion of the magnetizing yoke is brought into close contact with at least an axial end portion of the cylindrical elastic magnetic member, the cylindrical elastic magnetic member and the magnetizing yoke become concentric with each other, because the magnetizing portion of the magnetizing yoke is a conical surface slightly tilted with respect to the axis. Accordingly, the magnetizing yoke can be centered with respect to the cylindrical elastic magnetic member easily and reliably.

The present invention also provides a magnetized pulser ring comprising a cylindrical steel plate, and a cylindrical elastic magnetic member provided on a circumferential surface of the cylindrical steel plate, wherein magnetic force of one axial end portion of the cylindrical elastic magnetic member is stronger than magnetic force of the other axial end portion of the cylindrical elastic magnetic member, and magnetic force of the cylindrical elastic magnetic member is generally uniform along its circumferential direction.

The magnetized pulser ring of the invention can be manufactured with the use of the magnetizing apparatus or the magnetizing method as described above. Accordingly, this magnetized pulser ring has an advantage that the magnetic force is strong and does not vary in the circumferential direction, because the magnetized pulser ring is magnetized in a centered state by the magnetizing apparatus.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the magnetizing apparatus and magnetizing method for a magnetized pulser ring, as well as the magnetized pulser ring, according to the present invention are described in detail by way of an embodiment illustrated in the accompanying drawings.

Figure 1:
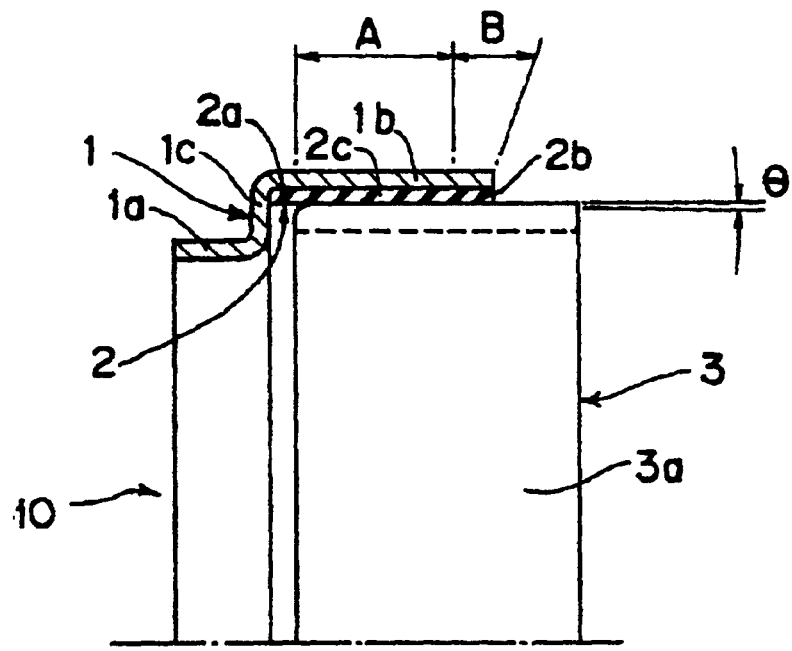
FIG. 1 is a schematic side view of main part of a magnetizing apparatus for a magnetized pulser ring, which is an embodiment of the present invention.
Figure 2:
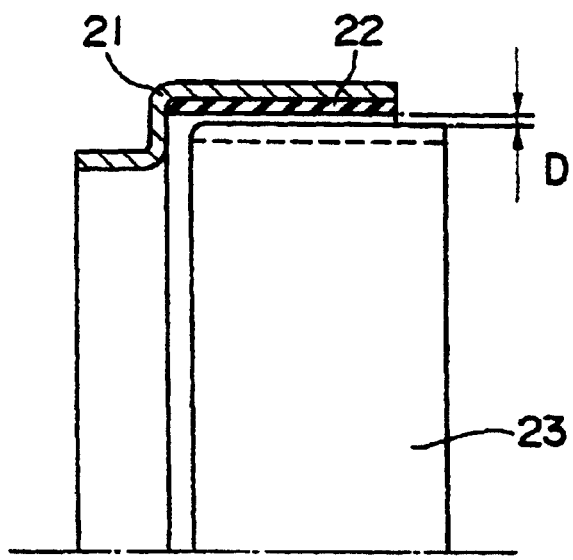
FIG. 2 is a schematic side view of main part of a magnetizing apparatus for a magnetized pulser ring according to the prior art.

FIG. 1 is a view of main part of a magnetizing apparatus for a magnetized pulser ring, which is an embodiment of the present invention, as viewed sideways.

The magnetizing apparatus for a magnetized pulser ring, as shown in FIG. 1, includes a magnetizing yoke 3 having a magnetizing portion 3a for radial opposition to a cylindrical elastic magnetic member 2 provided on the inner circumferential surface of a cylindrical steel plate 1. This magnetizing portion 3a is a conical surface slightly tilted with respect to the axis of the magnetizing yoke 3. For example, this conical surface is tilted by 1°, for example, with respect to the axis. That is, θ in FIG. 1 is 1° as an example. Also, the conical surface of the magnetizing portion 3a, which is a convex surface, magnetizes the cylindrical elastic magnetic member 2, which is provided on the inner circumferential surface of the cylindrical steel plate 1, from its inner circumferential surface side. Although not shown, N-pole areas and S-pole areas are alternately provided over the entire circumference on the outer periphery of the magnetizing yoke 3.

Also, the cylindrical steel plate 1 has a small-diameter portion 1a for fitting and fixation to an unshown turning wheel, a large-diameter portion 1b concentric with this small-diameter portion 1a, and a step portion 1c for making an end portion of the large-diameter portion 1b and an end portion of the small-diameter portion 1a continuous to each other. The cylindrical elastic magnetic member 2 is provided on the inner circumferential surface of the large-diameter portion 1b. This cylindrical steel plate 1 and the cylindrical elastic magnetic member 2 provided on the inner circumferential surface of the cylindrical steel plate 1 constitute a radial-magnetization type magnetized pulser ring 10.

It is noted that the cylindrical elastic magnetic member 2 is obtained by uniformly kneading nitrile rubber or gummous synthetic resin (e.g., polyamide, polyolefin, acrylic rubber base elastomer, fluororubber base elastomer, silicone base elastomer, ethylenic copolymers, etc.) and magnetic powder (e.g., barium ferrite powder, strontium ferrite powder, etc.).

Now, a magnetizing method to be performed on the cylindrical elastic magnetic member 2 of the magnetized pulser ring 10 is explained below.

With the magnetizing apparatus for a magnetized pulser ring having the above construction, for magnetization of the cylindrical elastic magnetic member 2, the magnetizing yoke 3 is inserted into the cylindrical steel plate 1 so that the magnetizing portion 3a of the magnetizing yoke 3 is radially opposed to the cylindrical elastic magnetic member 2, by which magnetic-pole areas of opposite polarities are alternately formed on the cylindrical elastic magnetic member 2. That is, N-pole areas and S-pole areas are alternately formed over the entire circumferential periphery of the cylindrical elastic magnetic member 2. Then, one axial end portion 2b of the cylindrical elastic magnetic member 2 comes into close contact with the magnetizing portion 3a of the magnetizing yoke 3, while the remaining portion of the cylindrical elastic magnetic member 2 other than the end portion 2b does not make close contact with the magnetizing portion 3a of the magnetizing yoke 3 and has a gap against the magnetizing yoke 3. More specifically, the cylindrical elastic magnetic member 2 and the magnetizing yoke 3 are in close contact with each other over a range B in FIG. 1, while there arises a gap between the cylindrical elastic magnetic member 2 and the magnetizing yoke 3 over a range A in FIG. 1. In this case, since the magnetizing portion 3a is a conical surface slightly tilted with respect to the axis, the magnetizing yoke 3 becomes close to axially central portion 2c of the cylindrical elastic magnetic member 2 over its entire circumference. Accordingly, the magnetic force to which the axially central portion 2c of the cylindrical elastic magnetic member 2 is magnetized can be enhanced. That is, the axially central portion 2c of the cylindrical elastic magnetic member 2 can be magnetized sufficiently and reliably.

In the case where a magnetized pulser ring having the above-described cylindrical elastic magnetic member 2 is used for a rotational speed detecting device, the axially central portion 2c of the cylindrical elastic magnetic member 2 is opposed to a rotational speed sensor. Then, since the axially central portion 2c of the cylindrical elastic magnetic member 2 is sufficiently magnetized, rotational-speed detection precision can be enhanced. Accordingly, the magnetized pulser ring can also be used for, for example, ABS-use rotational speed detecting devices.

Also, in the cylindrical elastic magnetic member 2 magnetized in the above-described manner, the magnetic force of the one axial end portion 2b is stronger than the magnetic force of the other axial end portion 2a. Since the axially central portion 2c of the cylindrical elastic magnetic member 2 is sufficiently magnetized, the magnetic force of the axially central portion 2c of the cylindrical elastic magnetic member 2 is a strong one. Further, the magnetic force of the cylindrical elastic magnetic member 2 is generally uniform along its circumferential direction.

Also, since the magnetizing portion 3a of the magnetizing yoke 3 is a conical surface whose axis is identical to the axis of the magnetizing yoke 3, bringing the magnetizing portion 3a of the magnetizing yoke 3 into close contact with the end portion 2b of the cylindrical elastic magnetic member 2 makes the cylindrical elastic magnetic member 2 and the magnetizing yoke 3 concentric with each other. Accordingly, the magnetizing yoke 3 can be centered with respect to the cylindrical elastic magnetic member 2 easily and reliably.

Also, since the eccentricity between the cylindrical elastic magnetic member 2 and the magnetizing yoke 3 is prevented by the reliable centering of the magnetizing yoke 3 with respect to the cylindrical elastic magnetic member 2, pitch precision of the N-pole areas and the S-pole areas can be improved.

Also, since the conical surface of the magnetizing portion 3a of the magnetizing yoke 3 is a convex surface, the cylindrical elastic magnetic member 2 provided on the inner circumferential surface of the cylindrical steel plate 1 can easily be magnetized from the inner circumferential surface side of the cylindrical elastic magnetic member 2.

Also, since the magnetizing portion 3a of the magnetizing yoke 3 is a conical surface tilted with respect to the axis of the magnetizing yoke 3, the insertion of the magnetizing yoke 3 into the cylindrical steel plate 1 can also be achieved easily.

In this embodiment, the conical surface of the magnetizing portion 3a is tilted by 1° with respect to the axis. However, the tilt angle of the conical surface is not limited to this. For example, the conical surface of the magnetizing portion 3a may be tilted at an angle smaller than 1° with respect to the axis, or at an angle larger than 1° with respect to the axis.

Also, although it has been shown above that the magnetizing yoke 3 is brought into close contact with the end portion 2b of the cylindrical elastic magnetic member 2, yet the magnetizing yoke 3 may also be brought into close contact with the whole cylindrical elastic magnetic member 2. Essentially, for magnetization of the cylindrical elastic magnetic member 2, the magnetizing yoke 3 has only to be brought into close contact with at least the axial end portion 2b of the cylindrical elastic magnetic member 2.

Also, although it has been shown above that the conical surface of the magnetizing portion 3a is a convex surface, the conical surface may also be a concave surface. That is, it is allowable to use a magnetizing yoke having a conical-shaped inner circumferential surface. In this case, since the conical surface of the magnetizing portion of the magnetizing yoke is a concave surface, the cylindrical elastic magnetic member provided on the outer circumferential surface of the cylindrical steel plate can be magnetized easily from its outer circumferential surface side. That is, so-called outer circumferential magnetization can easily be achieved. Needless to say, the same working effects as in the above embodiment can be obtained also in this case.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetizing apparatus for a magnetized pulser ring, in which a magnetizing portion of a magnetizing yoke is radially opposed to a cylindrical elastic magnetic member provided on a circumferential surface of a cylindrical steel plate so that magnetic-pole areas of opposite polarities are alternately formed circumferentially on the cylindrical elastic magnetic member, wherein:

the magnetizing portion is a conical surface tilted with respect to an axis of the magnetizing yoke so that one axial end portion of the cylindrical elastic magnetic member comes into close contact with the magnetizing portion of the magnetizing yoke while another portion of the cylindrical elastic magnetic member other than the end portion does not make close contact with the magnetizing portion of the magnetizing yoke thereby resulting in a gap being provided adjacent the magnetizing yoke; and wherein inner and outer surfaces of the cylindrical elastic magnetic member are each cylindrical in shape so as to be substantially parallel to one another.

2. The magnetizing apparatus for a magnetized pulser ring according to claim 1, wherein the conical surface which is the magnetizing portion is a convex surface, whereby the cylindrical elastic magnetic member is magnetized from an inner circumferential surface side of the cylindrical elastic magnetic member provided on an inner circumferential surface of the cylindrical steel plate.

3. The magnetizing apparatus for a magnetized pulser ring according to claim 1, wherein the conical surface which is the magnetizing portion is a concave surface, whereby the cylindrical elastic magnetic member is magnetized from an outer circumferential surface side of the cylindrical elastic magnetic member provided on an outer circumferential surface of the cylindrical steel plate.

4. A magnetizing method for a magnetized pulser ring, comprising the step of bringing the conical surface which is the magnetizing portion of the magnetizing apparatus for a magnetized pulser ring as defined in claim 1 into close contact with at least an axial end portion of the cylindrical elastic magnetic member, wherein the inner and outer surfaces of the cylindrical elastic magnetic member are each cylindrical in shape, thereby allowing the cylindrical elastic magnetic member to be magnetized.

5. A magnetized pulser ring comprising a cylindrical steel plate, and a cylindrical elastic magnetic member provided on a circumferential surface of the cylindrical steel plate, wherein inner and outer surfaces of the cylindrical elastic magnetic member are each cylindrical in shape, wherein the magnetic force of one axial end portion of the cylindrical elastic magnetic member is stronger than the magnetic force of the other axial end portion of the cylindrical elastic magnetic member, and magnetic force of the cylindrical elastic magnetic member is generally uniform along its circumferential direction.

6. The magnetizing apparatus of claim 1, wherein the conical surface of the magnetizing portion is tilted by 1 degree with respect to the axis of the magnetizing yoke.

* * * * *